United States Patent [19]

Beneteau et al.

[11] Patent Number: 4,782,549
[45] Date of Patent: Nov. 8, 1988

[54] DEVICE FOR CONNECTING A WIPING ELEMENT TO THE SUPERSTRUCTURE OF A WIPER BLADE

[75] Inventors: Christian Beneteau, Gorcy, France; Norbert Guerard, Virton, Belgium

[73] Assignee: Champion Spark Plug Europe S.A., Binche, Belgium

[21] Appl. No.: 160,244

[22] Filed: Feb. 25, 1988

Related U.S. Application Data

[63] Continuation-in-part of Ser. No. 086,364, Aug. 17, 1987.

[51] Int. Cl.⁴ ............................................... B60S 1/02
[52] U.S. Cl. ................................................ 15/250.42
[58] Field of Search .................... 15/250.36–250.42

[56] References Cited

U.S. PATENT DOCUMENTS 2,924,839  2/1960  Anderson .
3,386,123  6/1968  Oishei et al. ............. 15/250.42
3,696,497  10/1972  Quinlan et al. .
3,702,490  11/1972  Quinlan et al. ............. 15/250.42

FOREIGN PATENT DOCUMENTS 3208749  10/1982  Fed. Rep. of Germany ... 15/250.42
2502086  9/1982  France .

Primary Examiner—Peter Feldman
Attorney, Agent, or Firm—Wood, Dalton, Phillips, Mason & Rowe

[57] ABSTRACT

A device for securing a wiping element to the superstructure of a wiper blade. The wiping element has reinforcing backing strips extending lengthwise thereof. The supersturcture has claws which surround the backing strips and at least a portion of the wiping element. The backing strips are preferably formed by extrusion and each is stamped after the extrusion process at its interior longitudinal edge to define a flattened area which projects from the interior edge. With the superstructure and wiping element assembled, the flattened area of each strip is compressed against the wiping element and thereby prevents relative lengthwise movement between the wiping element and the backing strips.

2 Claims, 2 Drawing Sheets

DEVICE FOR CONNECTING A WIPING ELEMENT TO THE SUPERSTRUCTURE OF A WIPER BLADE

CROSS REFERENCE

This is a continuation-in-part application of our co-pending application Ser. No. 086,364 filed Aug. 17, 1987, entitled "Device for Connecting a Wiping Element to the Superstructure of a Wiper Blade".

TECHNICAL FIELD

The present invention relates to a device for securing a wiping element to the superstructure of a wiper blade wherein the wiping element is reinforced by two backing strips respectively located in two longitudinally extending recesses provided in the wiping element and wherein the superstructure is provided with at least two claws which partially surround the two backing strips and the upper portion of the wiping element.

BACKGROUND ART

Prior art devices of the type described above are disclosed in French patent application No. 2,502,086 and in U.S. Pat. No. 2,924,839. In the French patent application means are provided for retaining backing strips of a wiping element and the assembled wiping element/backing strips are locked with respect to one of the claws of the superstructure of the wiper blade by means of two lips cut in each backing strip respectively on each side of the claw and bent outwardly with respect to the longitudinal axis of the wiping element. A similar system is disclosed in the U.S. patent, the only difference being that the two lips are not bent outwardly, but rather upwardly and downwardly with respect to the longitudinal axis of the wiping element.

Another prior art structure for securing a wiping element to wiper blade superstructure is shown in U.S. Pat. No. 3,386,123. A backing strip is stamped from a flat strip of flexible material and has inwardly projecting protuberances to compress a portion of the wiping element to which it connects. The principal problem with the device in U.S. Pat. No. 3,386,123 is that the backing strips, being formed by a stamping operation, are relatively difficult to manufacture and, therefore, the manufacturing process is costly.

DISCLOSURE OF THE INVENTION

The present invention is concerned with a device for securing a wiping element to the superstructure of a wiper blade, wherein the wiping element is reinforced by two backing strips extending lengthwise of the wiping element, and the superstructure has at least two claws which partially surround the backing strips and an upper portion of the wiping element. Structure is provided to prevent longitudinal shifting of the claws relative to the backing strip.

An object of the invention is to provide a device which is similar to those described above but which is simpler, easier to manufacture and, therefore less expensive.

The device according to the invention is characterized by the fact that in the area of at least one of the claws of the superstructure of the wiper blade each of the two backing strips is provided, at its internal longitudinal edge, with at least one flattened area which laterally projects from the interior longitudinal edge.

As will be explained in the following portions of the description, the above-mentioned characteristic of the inventive structure prevents any longitudinal displacement of the backing strips with respect to the wiping element with the superstructure claws surrounding the backing strip and wiping element.

In the area of at least one of the claws of the superstructure of the wiper blade, each of the two backing strips may be provided, at its exterior longitudinal edge, with at least one flattened area which projects laterally outwardly from the exterior longitudinal edge of the backing strip.

Preferably, the backing strips are formed by an extrusion process, thereby simplifying manufacture of the strips and reducing the attendant costs. Thereafter, the flattened area is formed by heat pressing or stamping the strips.

BRIEF DESCRIPTION OF THE DRAWINGS

Other features of the device according to the invention will be better understood when reading the following portions of the description in conjunction with the appended drawings, wherein.

BEST MODE FOR CARRYING OUT THE INVENTION

Figure 1:
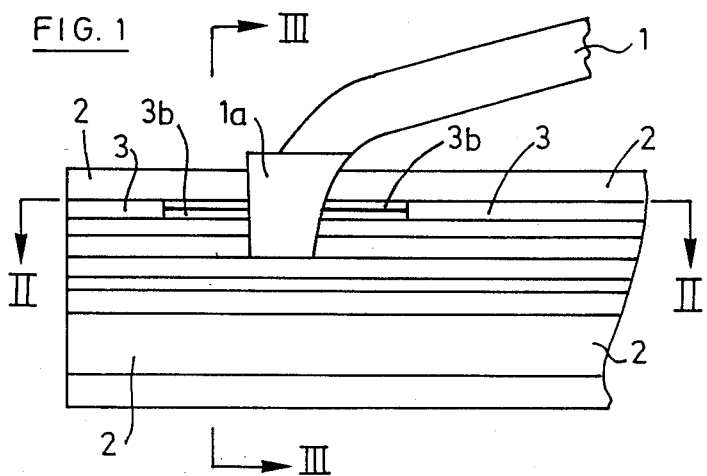
FIG. 1 is a partial elevation view of a wiper blade according to the invention.
Figure 2:
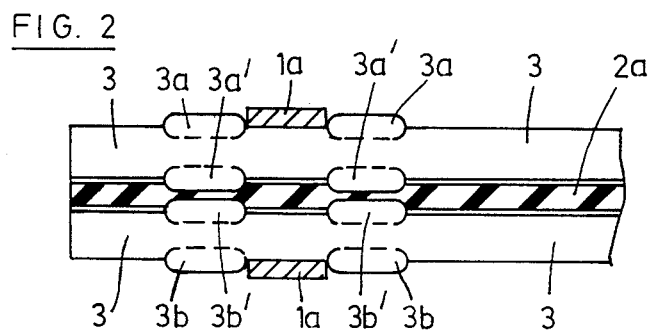
FIG. 2 is a section view of the wiper blade along line II—II of FIG. 1.
Figure 3:
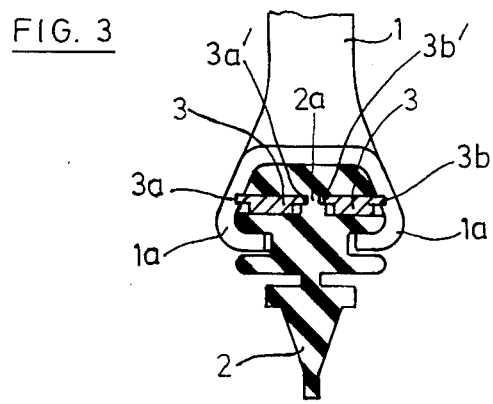
FIG. 3 is a section view of the wiper blade along line III—III of FIG. 1.

In FIGS. 1, 2 and 3 (first embodiment) the following elements of a wiper blade are shown: a portion of a superstructure 1 for the wiper blade; a claw 1a which is part of the superstructure 1; a resilient wiping element 2; two backing strips 3; flattened areas 3a, 3a', 3b, 3b' on the two backing strips 3; and a portion 2a (FIG. 2) of the wiping element which is located between the two backing strips 3. The backing strips 3 are preferably formed by an extrusion process. Extrusion forming of the backing strips 3 is simpler and cheaper than conventionally used stamping processes.

As can be seen in the above figures each backing strip 3 is provided with two flattened areas 3a, 3b which laterally project from an exterior longitudinal edge. The flattened areas 3a, 3b are located on both longitudinal sides of the claw 1a of the superstructure 1 of the wiper blade. After assembly of the different elements, the backing strips 3 are longitudinally locked with respect to the claw 1a and consequently with respect to the superstructure 1 of the wiper blade. Other structure can be used to prevent relative longitudinal shifting between the superstructure claws and the backing strips.

According to the invention the wiping element 2 is longitudinally locked with respect to the two backing strips 3 by flattened areas 3a', 3b' (FIGS. 2 and 3) provided on the interior longitudinal edges 4 of the two backing strips 3 and laterally projecting from the interior edges 4. After the strips 3 are extruded, the areas 3a' 3b' are stamped so that the areas 3a', 3b' of the strips 3 are squeezed to flow inwardly past the interior strip edges.

As the different elements are being assembled, the two backing strips 3 are squeezed towards each other in the longitudinal axial plane of the wiping element 2 so as to permit the claw 1a to pass over one pair of laterally aligned flattened areas 3a, 3b. The flattened areas 3a, 3b are located on the sides of the claw 1a which claw is closest to one extremity of the wiping element 2. Once the backing strips 3 and the wiping element 2 are in their assembled position (FIG. 2), the flattened areas 3a', 3b' provided on the interior longitudinal edges 4 of the backing strips 3 compress the portion 2a of the wiping element and thus prevent the wiping element from moving longitudinally with respect to the backing strip 3.

In FIGS. 1, 2 and 3 each backing strip 3 is provided with two longitudinally spaced flattened interior areas 3a', 3a' or 3b', 3b'. It is however quite evident that the two flattened areas on each backing strip can be replaced by only one. If only a single, flattened interior area per backing strip is used, it is preferably located in alignment with the inside of the claw 1a of the superstructure 1 of the wiper blade.

Figure 4:
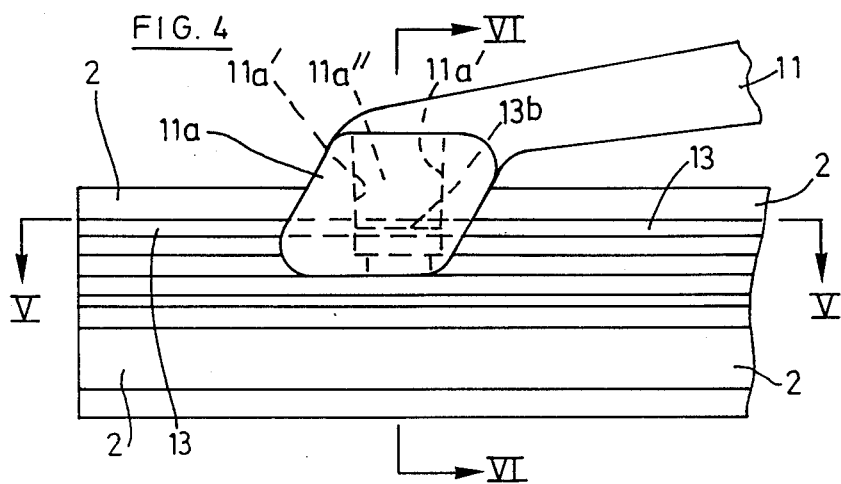
FIG. 4 is a partial elevation view of a modified form of wiper blade according to the invention.
Figure 5:
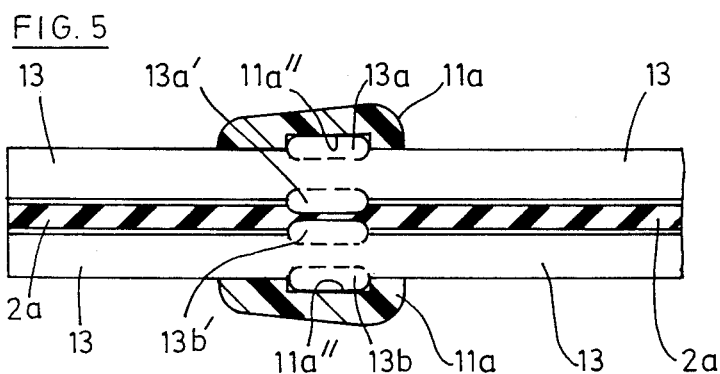
FIG. 5 is a section view of the wiper blade along line V—V of FIG. 4.
Figure 6:
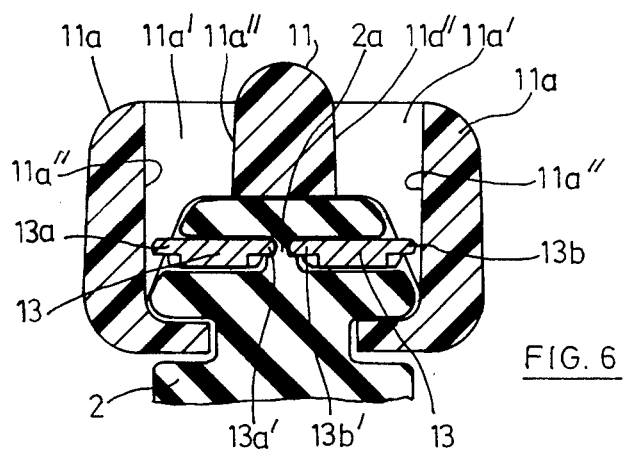
FIG. 6 is an enlarged, partial section view of the wiper blade along line VI—VI of FIG. 4.

In FIGS. 4, 5 and 6 a second embodiment is shown and has the following elements: a portion of a superstructure 11 of a wiper blade; a claw 11a which is an integral part of the superstructure 11; a wiping element 2; two backing strips 13; laterally aligned external and internal flattened areas 13a, 13a', 13b, 13b' respectively on the two backing strips 13; and a portion 2a (FIG. 5) of the wiping element 2, which portion 2a is located between the two backing strips 13.

The claw 11a is provided with two substantially vertical openings which are defined by transverse planes 11a' and by longitudinal planes 11a". When the claw 11a is assembled with the wiping element, each of the openings is located above an exterior longitudinal edge of one of the two backing strips 13.

Each backing strip 13 is provided with a single flattened area 13a or 13b, preferably of oval configuration with an elongate edge aligned with the length of each backing strip 13, which flattened area projects laterally from an exterior longitudinal edge 15 of the appropriate strip 13. The flattened areas 13a, 13b on the pair of backing strips 13, 13 are located in alignment with the inside of the claw 11a of the superstructure 11 of the wiper blade. Preferably, the flattened areas are entirely aligned transversely of said backing strips with the lengthwise extent of the claw 11a.

The dimensions of the flattened areas 13a, 13b are adapted to the horizontal dimensions of the two openings 14 provided in the claw 11a and defined by transverse and longitudinal planes 11a', 11a". In other words, the length of the openings in the longitudinal direction of the wiper blade is slightly greater than the corresponding length of the flattened areas 13a, 13b. The transverse edges of the flattened areas 13a, 13b thus practically touch the transverse planes 11a' of the openings provided in the claw 11a (FIG. 5). The backing strips 13 thus cannot move longitudinally with respect to the claw 11a and consequently with respect to the superstructure 11 of the wiper blade.

Just as in the first embodiment, the wiping element 2 is longitudinally locked with respect to the two backing strips 13 by means of the flattened areas 13a', 13b' provided on and projecting from the interior longitudinal edges 14' of the backing strips 13.

In the second embodiment (FIGS. 4, 5 and 6), the claw 11a and the superstructure 11, or the element of the superstructure of which the claw 11a is in integral part, is made of a suitable plastic material.

The strips 13 of the second embodiment are also preferably extrusion formed with the flattened areas 13a', 13b' formed by stamping as in the previously described embodiment.

It is to be noted that when the superstructure of the wiper blade is made of plastic the structure in the first embodiment can also be used, i.e. each backing strip can be provided with two flattened areas which laterally project from an exterior longitudinal edge with the flattened areas located on both sides of the claw 11a of the superstructure 11 of the wiper blade.

The above-described wiper blades each comprises two backing strips 3, 13 which are independent one from the other, i.e. they are not linked together. It is however evident that the invention also applies to wiper blades which comprise two backing strips which are linked together at one or at several points.

We claim:

1. A device for securing a resilient wiping element (2) to a superstructure (1, 11) on a wiper blade, said resilient wiping element reinforced by two backing strips (3,13) each having interior and exterior longitudinal edges, said backing strips being located in two longitudinally extending recesses provided in the wiping element so that the interior edges are adjacent to the wiping element (2) and wherein the superstructure (1, 11) is provided with at least two claws (1a, 11a) which partially surround the two backing strips (3, 13) and a portion of the wiping element (2), and means are provided to maintain at least one of the claws (1a, 11a) in a predetermined position on the two backing strips (3, 13), characterized in that in the area of at least one of the claws (1a, 11a) of the superstructure (1, 11) each of the two backing strips (3, 13) is provided, at its interior longitudinal edge, with at least one flattened area (13a', 13b') which laterally projects from said interior longitudinal edge compressibly against the wiping element with the wiping element and superstructure assembled, each said flattened area having an oval configuration with an elongate edge in alignment with the length of its respective interior longitudinal edge and compressibly maintained against the wiping element, said elongate edges on the two backing strips being aligned with each other transverse to the length of the backing strips and being entirely aligned transversely of said backing strips with the lengthwise extent of said one claw.

2. A device according to claim 1, characterized in that each backing strip (13) is provided with only a single flattened area (13a', 13b') which laterally projects from the interior longitudinal edge of said backing strips (13).

* * * * *